(12) United States Patent
Yamaguchi et al.

(10) Patent No.: US 8,265,264 B2
(45) Date of Patent: Sep. 11, 2012

(54) WATERPROOF ELECTRONIC APPLIANCE

(75) Inventors: Shigeru Yamaguchi, Kawasaki (JP);
Shingo Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 743 days.

(21) Appl. No.: 12/361,948

(22) Filed: Jan. 29, 2009

(65) Prior Publication Data

US 2009/0211775 A1 Aug. 27, 2009

(30) Foreign Application Priority Data

Feb. 25, 2008 (JP) .................. 2008-043338

(51) Int. Cl.
*H04M 1/00* (2006.01)
*H04M 9/00* (2006.01)

(52) U.S. Cl. .................. 379/437; 379/433.13; 455/575.3

(58) Field of Classification Search ............ 379/433.01, 379/433.05, 433.11, 433.13, 437, 438, 440; 455/550, 575.1, 575.3, 90.3, 90.2, 575.8, 455/566; 174/50.5; 385/135–137
See application file for complete search history.

(56) References Cited

U.S. PATENT DOCUMENTS

| | | | | |
|---|---|---|---|---|
| 6,495,759 B1 * | 12/2002 | Yamamoto et al. | ....... | 174/106 R |
| 6,990,355 B2 * | 1/2006 | Ueyama et al. | ............ | 455/550.1 |
| 7,251,512 B2 * | 7/2007 | Komiyama | ................ | 455/575.3 |
| 7,941,196 B2 * | 5/2011 | Kawasaki et al. | .......... | 455/575.8 |
| 8,003,898 B2 * | 8/2011 | Hayashi et al. | ................ | 174/385 |
| 2009/0270135 A1 * | 10/2009 | Shoji et al. | ..................... | 455/566 |
| 2011/0045882 A1 * | 2/2011 | Yamaguchi et al. | ....... | 455/575.8 |

FOREIGN PATENT DOCUMENTS

JP 2006-93510 4/2006

* cited by examiner

*Primary Examiner* — Davetta W. Goins
*Assistant Examiner* — Phylesha Dabney
(74) *Attorney, Agent, or Firm* — Staas & Halsey LLP (57) ABSTRACT

A waterproof electronic appliance has a casing including a bottom panel, a top panel, and a side wall which is divided into an upright wall adjacent to the bottom panel and a vertical wall adjacent to the top panel. A first double-sided adhesive tape is adhered on a top end surface of the upright wall. A second double-sided adhesive tape is adhered on a bottom end surface of the vertical wall. A cable including signal lines and a tube covering the signal lines, extends from inside to outside of the casing through the upright wall and the vertical wall. The first and second double-sided adhesive tapes adhere to an outer surface of the tube sandwiched between the upright wall and the vertical wall, and the adhesive tapes adhere to each other in an area adjacent to the sandwiched tube.

7 Claims, 11 Drawing Sheets

WATERPROOF ELECTRONIC APPLIANCE

CROSS-REFERENCE TO RELATED APPLICATIONS

This application is related to and claims priority to Japanese Patent application no. 2008-043338, filed on Feb. 25, 2008 in the Japan patent Office, the entire contents of which are incorporated by reference herein.

FIELD

The present invention relates to for example, a waterproof electronic appliance including a casing and a cable extending from inside to the outside of the casing.

BACKGROUND

Waterproof electronic appliances such as a waterproof mobile phone have become available in recent years.

A mobile phone is described here as an example of an electronic appliance. A type of mobile phone has a main unit and a display unit. The display unit can be opened and closed relative to the main unit. Signals are exchanged between the main unit and the display unit in such a mobile phone through signal lines. For this purpose, the signal lines are routed such that the signal lines extend out of a casing of the main unit into a casing of the display unit. In order to make the mobile phone waterproof, formation of a waterproof structure is important for areas where the signal lines overlap walls of the casings.

A flexible cable integrally formed with rubber or the like, and a flexible cable sandwiched between rubber members or double-sided adhesive tapes, are known as a waterproof structure for such areas. Another example of a known waterproof structure is a structure in which a sealing compound seals a casing hole through which signal lines extend.

The use of rubber, which is suitable for a thin flexible cable, however, does not guarantee waterproofness for separate signal lines, because gaps are created among the signal lines. When using a sealing compound for sealing a hole, it is necessary that the sealing compound flows into the gaps among bundled signal lines. However, determining whether the gaps between the signal lines are sealed with the sealing compound is difficult, which limits the reliability of waterproofness.

Japanese Laid-open Patent Publication No. 2006-93510 discloses a waterproof structure in which a flexible cable and a sealing compound are used. However, the technique disclosed in Japanese Laid-open Patent Publication No. 2006-93510 provides a reliable waterproof structure only when a flexible cable is used. The waterproofing problem occurring when separate signal lines are used is not solved with the technique.

A flexible cable is convenient for connecting, for example, adjacent points in a main unit with adjacent points in a display unit of a mobile phone. However, it is more advantageous, to use separate signal lines that are bundled only between the main unit and the display unit than to use a flexible cable in order to connect remote points in the main unit with remote points in the display unit, except with regard to waterproofness.

SUMMARY

Accordingly, an electronic appliance is provided using separate signal lines and having a waterproof structure.

According to an aspect of the invention, a waterproof electronic appliance has a casing including a bottom panel, a top panel, and a side wall which is divided into an upright wall adjacent to the bottom panel and a vertical wall adjacent to the top panel, a first double-sided adhesive tape adhered on a top end surface of the upright wall, a second double-sided adhesive tape adhered on a bottom end surface of the vertical wall, and a cable including signal lines and a tube covering the signal lines, and extending from inside to outside of the casing through the upright wall and the vertical wall, wherein the first and second double-sided adhesive tapes adhere to an outer surface of the tube where the tube is sandwiched between the upright wall and the vertical wall, and the adhesive tapes adhere to each other in an area adjacent to the sandwiched tube.

The object and advantages of the invention will be realized and attained by means of the elements and combinations particularly pointed out in the claims.

It is to be understood that both the foregoing general description and the following detailed description are exemplary and are not restrictive of the invention, as claimed.

The above-described embodiments of the present invention are intended as examples, and all embodiments of the present invention are not limited to including the features described above.

DETAILED DESCRIPTION OF THE PREFERRED EMBODIMENTS

Reference may now be made in detail to embodiments of the present invention, examples of which are illustrated in the accompanying drawings, wherein like reference numerals refer to like elements throughout.

Hereinafter, an electronic appliance is described according to an embodiment.

Figure 1:
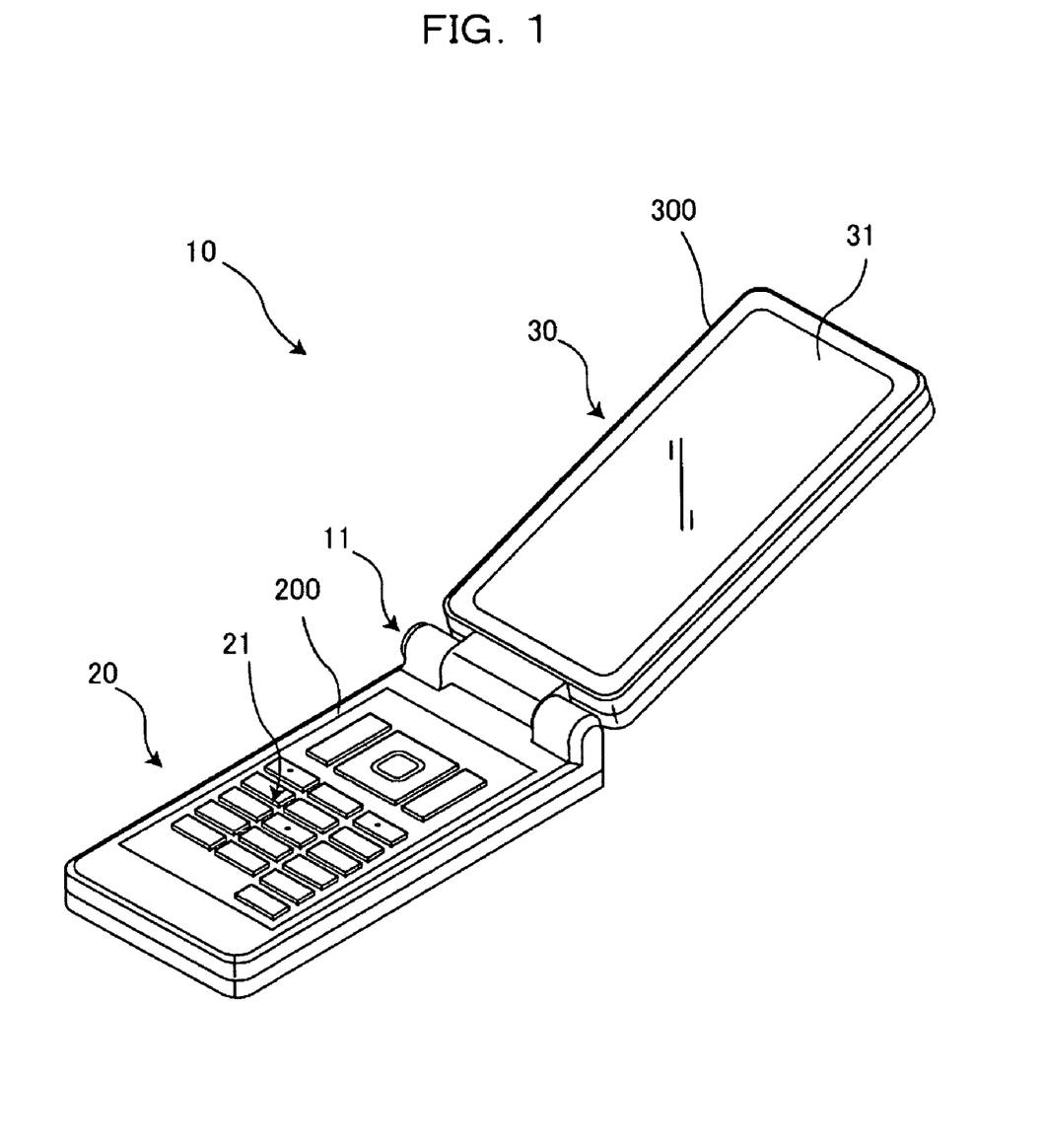
FIG. 1 is an external perspective view of a mobile phone that is an embodiment of a waterproof electronic appliance.

FIG. 1 is an external perspective view of a mobile phone that is an embodiment of a waterproof electronic appliance.

The mobile phone 10 includes a main unit 20 and a display unit 30. The display unit 30 is attached to the main unit 20 such that the display unit 30 can be opened and closed around a hinge 11.

Keys 21 are arranged on the main unit 20. A display screen 31 for displaying images is disposed on the display unit 30.

Figures 2A, 2B:
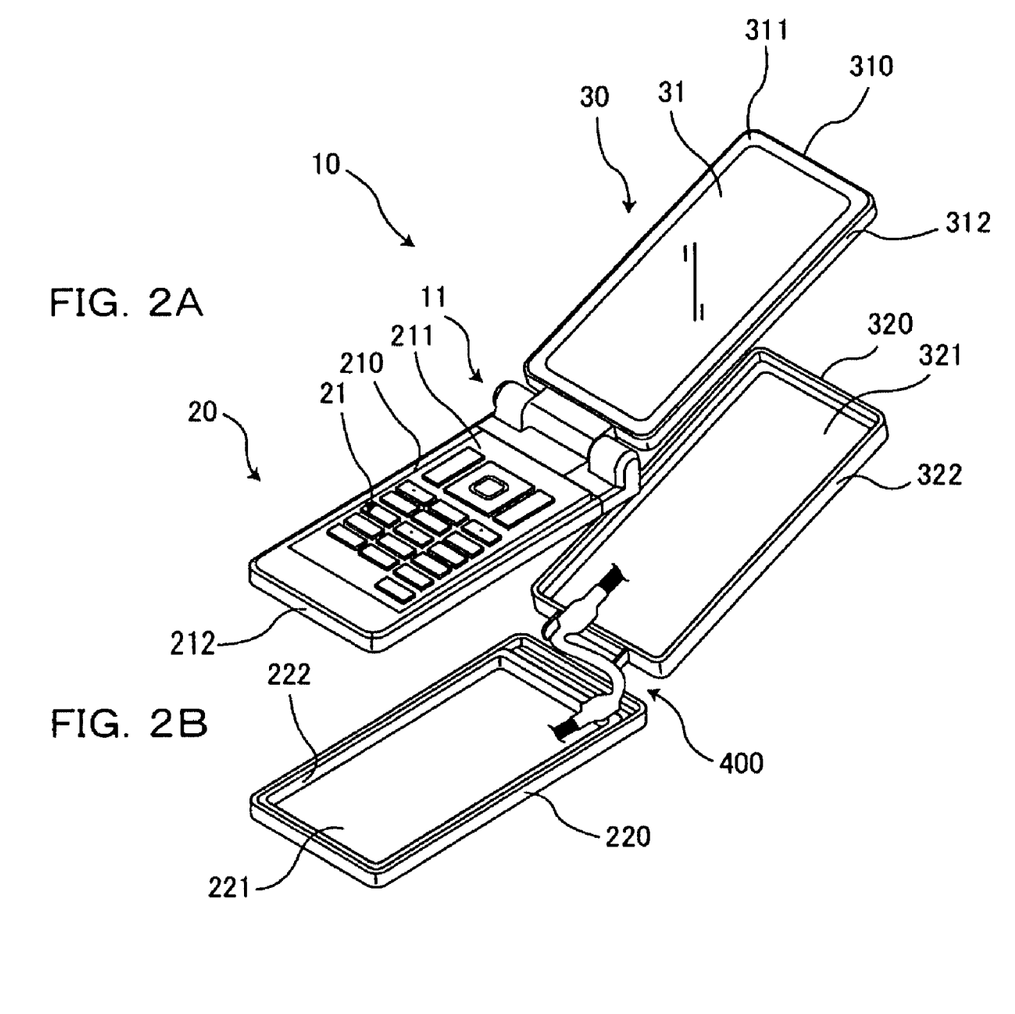
FIG. 2A is a perspective view of an upper casing of the mobile phone shown in FIG. 1.
FIG. 2B is a perspective view of a lower casing of the mobile phone shown in FIG. 1.

The main unit 20 has a casing 200. The casing 200 contains electronic circuits for performing various functions. The display unit 30 has a casing 300. The casing 300 contains electronic circuits for displaying images on the display screen 31 and performing various other functions. As shown in FIG. 2B, a cable 400, which is a bundle of signal lines, connects the electronic circuits in the casing 200 of the main unit 20 with the electronic circuits in the casing 300 of the display unit 30.

The mobile phone 10 can perform functions such as telephone calling, and sending and receiving of electronic mails, by wireless communication.

Figures 3A, 3B:
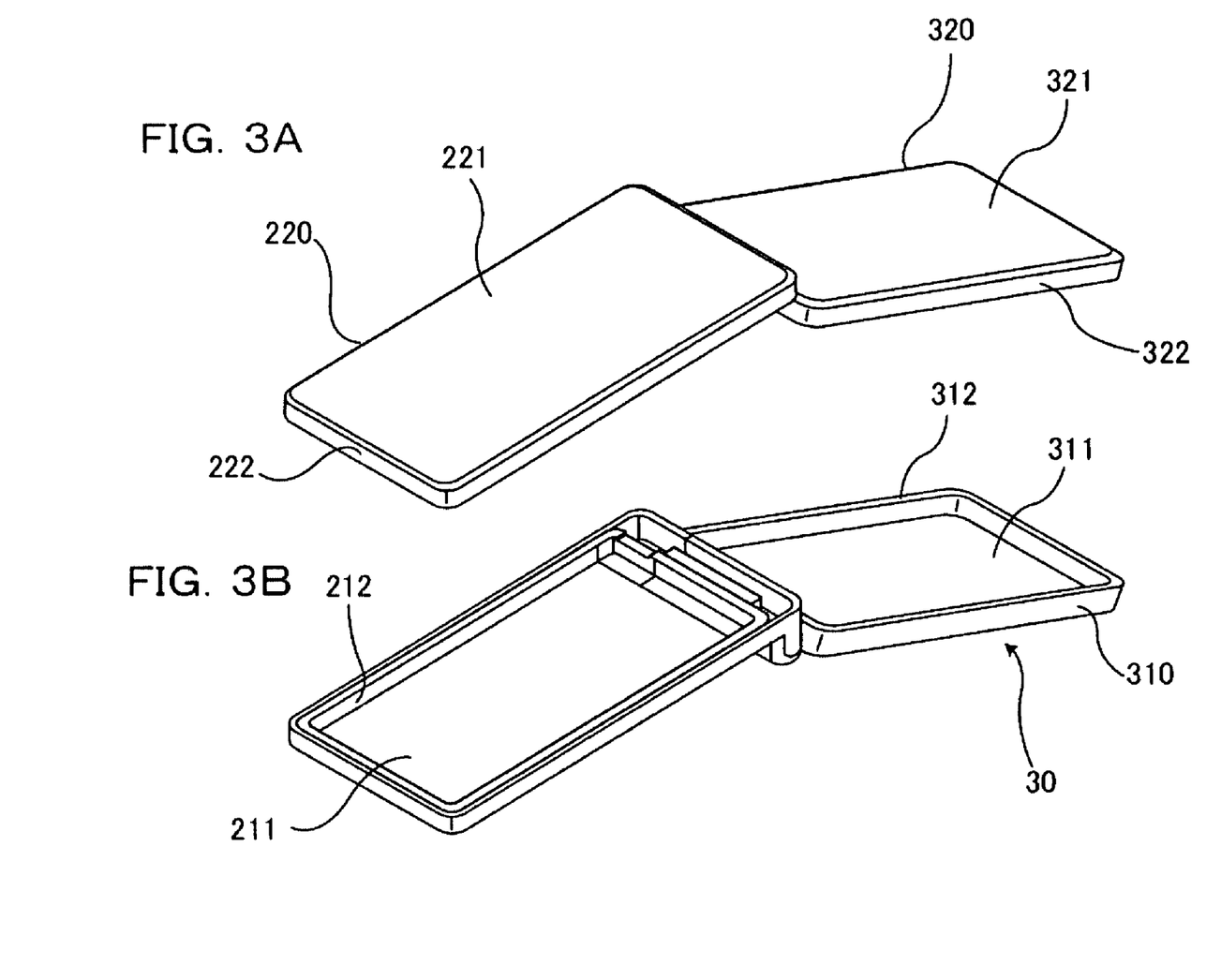
FIG. 3A is a perspective view of the lower casing of the mobile phone shown in FIG. 1.
FIG. 3B is a perspective view of the upper casing of the mobile phone shown in FIG. 1.

FIG. 2A is a perspective view of an upper casing of the mobile phone shown in FIG. 1. FIG. 2B is a perspective view of a lower casing of the mobile phone shown in FIG. 1. FIG. 3A is a perspective view of the lower casing of the mobile phone shown in FIG. 1. FIG. 3B is a perspective view of the upper casing of the mobile phone shown in FIG. 1.

The casing 200 of the main unit 20 of the mobile phone 10 includes an upper casing 210 and a lower casing 220. The casing 300 of the display unit 30 includes an upper casing 310 and a lower casing 320. The hinge 11 is mounted on the upper casing 210 of the main unit 20 and on the upper casing 310 of the display unit 30.

The upper casing 210 of the main unit 20 includes a top panel 211 on which the keys 21 are arranged, and a vertical wall 212 that descends from a peripheral edge of the top panel 211 toward the lower casing 220 and surrounds the top panel 211. The lower casing 220 of the main unit 20 includes a bottom panel 221, and an upright wall 222 that stands on a peripheral edge of the bottom panel 221 and surrounds the bottom panel 221.

The upper casing 310 of the display unit 30 includes a top panel 311 on which the display screen 31 is disposed. A vertical wall 312 descends from a peripheral edge of the top panel 311 toward the lower casing 320 and surrounds the top panel 311. The lower casing 320 of the display unit 30 includes a bottom panel 321. An upright wall 322 stands on a peripheral edge of the bottom panel 321 and surrounds the bottom panel 321.

As shown in FIG. 2B, the cable 400 connects the inside of the casing 200 of the main unit 20 with the inside of the casing 300 of the display unit 30.

Figure 4:
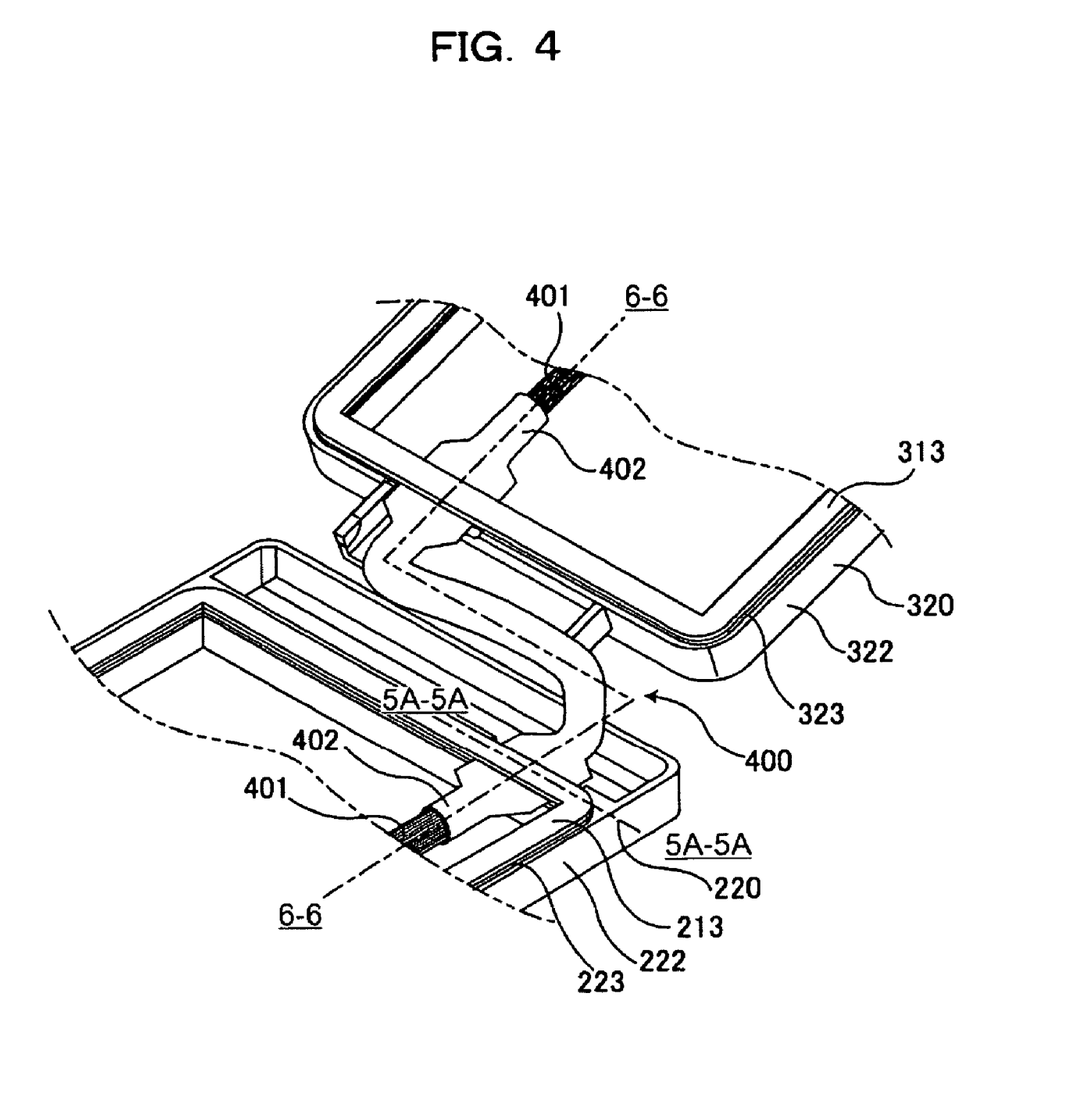
FIG. 4 is a perspective view of a cable extending between a main unit and a display unit.
Figure 5A:
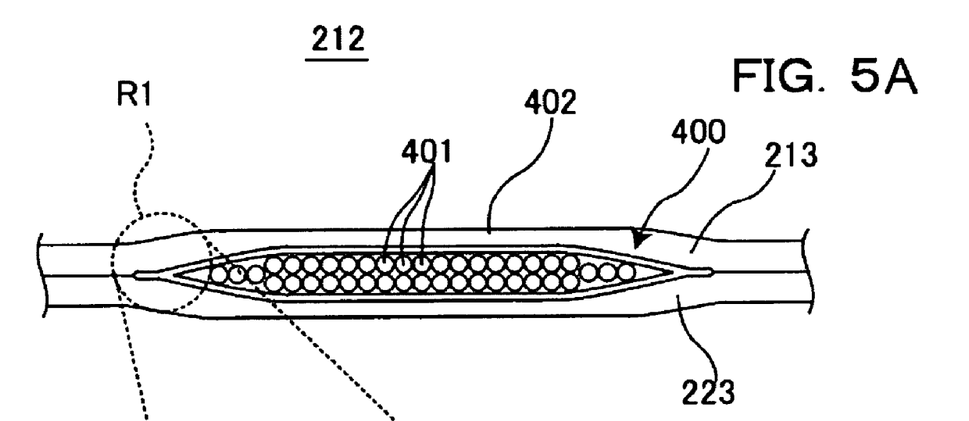
FIG. 5A is a sectional view taken along line 5A-5A shown in FIG. 4.
Figure 5B:
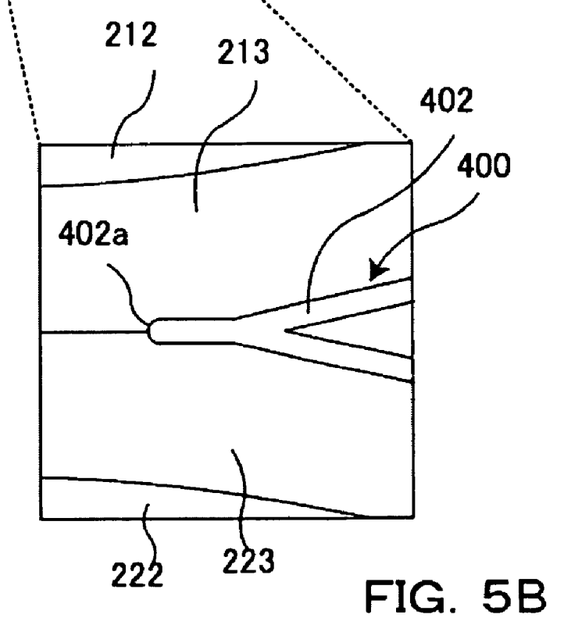
FIG. 5B is an enlarged view of an area in a circle R1 shown in FIG. 5A.
Figure 6:
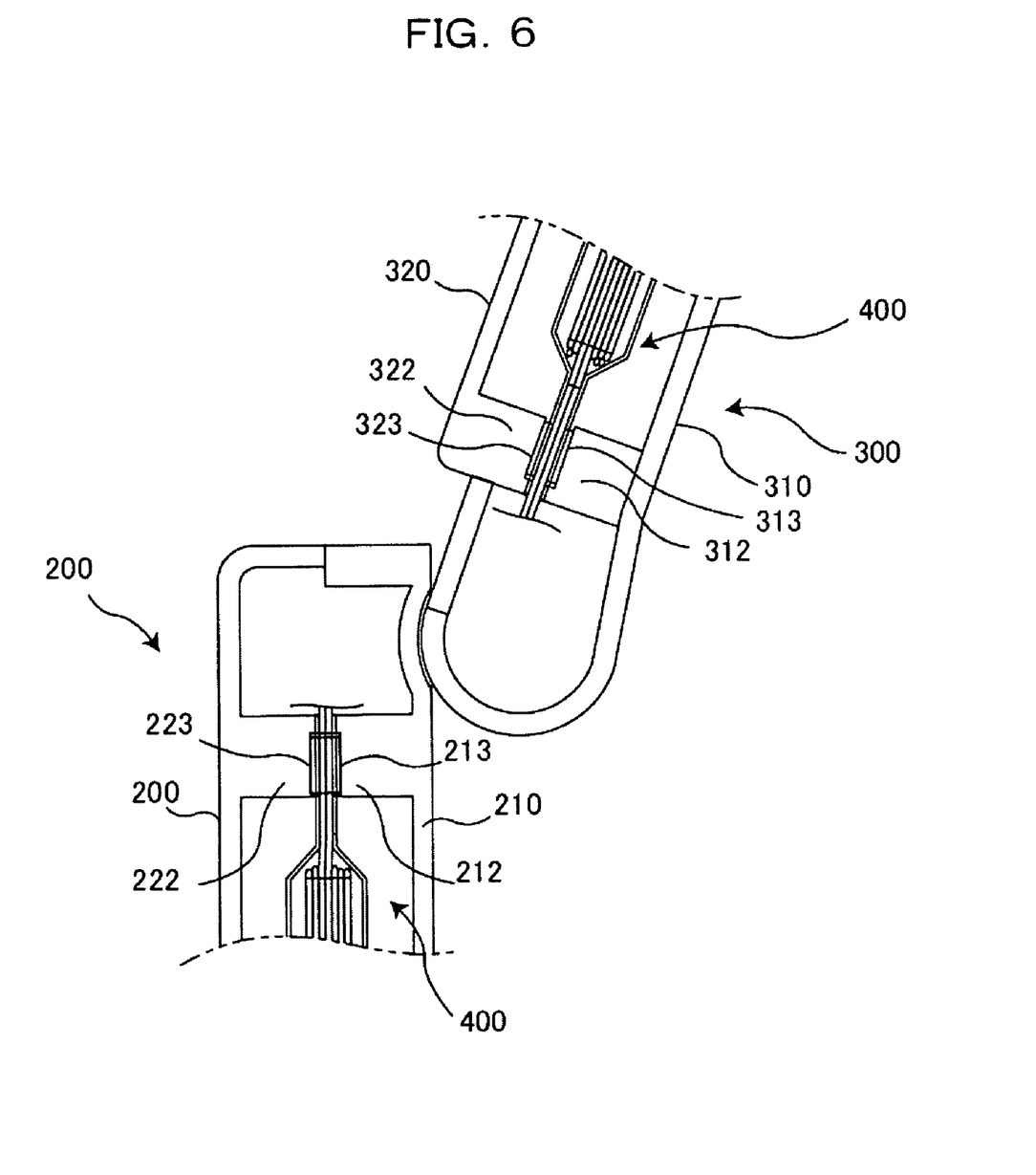
FIG. 6 is a sectional view taken along line 6-6 shown in FIG. 4.

FIG. 4 is a perspective view of a cable extending between a main unit and a display unit. FIG. 5A is a sectional view taken along line 5A-5A shown in FIG. 4. FIG. 5B is an enlarged view of an area in a circle R1 shown in FIG. 5A. FIG. 6 is a sectional view taken along line 6-6 shown in FIG. 4.

The inside of the lower casing 220 of the main unit 20 and the inside of the lower casing 320 of the display unit 30 are partially shown in the figures. However, the inside of the upper casing 210 of the main unit 20 and the inside of the upper casing 310 of the display unit 30 are not shown in the figures.

Double-sided adhesive tapes 223 and 323 are stuck on top end surfaces of the upright walls 222 and 322 of the lower casings 220 and 320, respectively. The cable 400 is attached to the double-sided adhesive tapes 223 and 323. Moreover, double-sided adhesive tapes 213 and 313 are stuck on bottom end surfaces of the vertical walls 212 and 312 of the upper casings 210 and 310, respectively. FIG. 4 includes an illustration of the double-sided adhesive tapes 213 and 313, which are stuck on the bottom end surfaces of the vertical walls 212 and 312 of the upper casings 210 and 310, respectively.

A part of the cable 400 which extends out of the casing 200 of the main unit 20 is sandwiched between the double-sided adhesive tape 213 on the bottom end surface of the vertical wall 212 of the upper casing 210 and the double-sided adhesive tape 223 on the top end surface of the upright wall 222 of the lower casing 220. A part of the cable 400 which extends into the casing 300 of the display unit 30 is sandwiched between the double-sided adhesive tape 313 on the bottom end surface of the vertical wall 312 of the upper casing 310 and the double-sided adhesive tape 323 on the top end surface of the upright wall 322 of the lower casing 320.

The cable 400 includes signal lines 401 of thin wires and a tube 402 covering the signal lines 401. The tube 402 is made of a soft waterproof film material. As shown in FIG. 5A, a part of the tube 402 that is sandwiched between the vertical wall 212 and the upright wall 222 has a flat shape extending in the direction in which the end surfaces of the vertical wall 212 and the upright wall 222 extend. By using the soft material, the tube 402 can be made sufficiently flat with ease. The double-sided adhesive tapes 213, 313, 223 and 323, which surround the tube 402, are made of a material whose thickness is reduced when pressed. A urethane-based material or an olefin-based material is an example of such a material. Since the double-sided adhesive tapes 213, 313, 223 and 323 are made of the material whose thickness is reduced when pressed, the double-sided adhesive tapes conform to the flat tube 402, thereby improving waterproofness.

As shown in FIG. 5A, the double-sided adhesive tapes 213 and 223 adhere to the outer surfaces of the tube 402 at the part where the cable 400 is sandwiched between the vertical wall 212 and the upright wall 222. The double-sided adhesive tapes adhere to each other in areas adjacent to the tube 402 so that the periphery of the tube 402 is watertight. As shown in FIG. 5B, a flat end 402a of the tube 402 is shaped in an arc with a minimal radius. The flat end 402a tightly contacts with the double-sided adhesive tapes 213 and 223 so as to keep watertightness. Note that a corresponding part of the casing 300 of the display unit 30 has a structure similar to the structure shown in FIG. 5A, although only a sectional view of the casing 200 of the main unit 20 is shown in FIG. 5A.

Next, a first modification is described.

Figure 7:
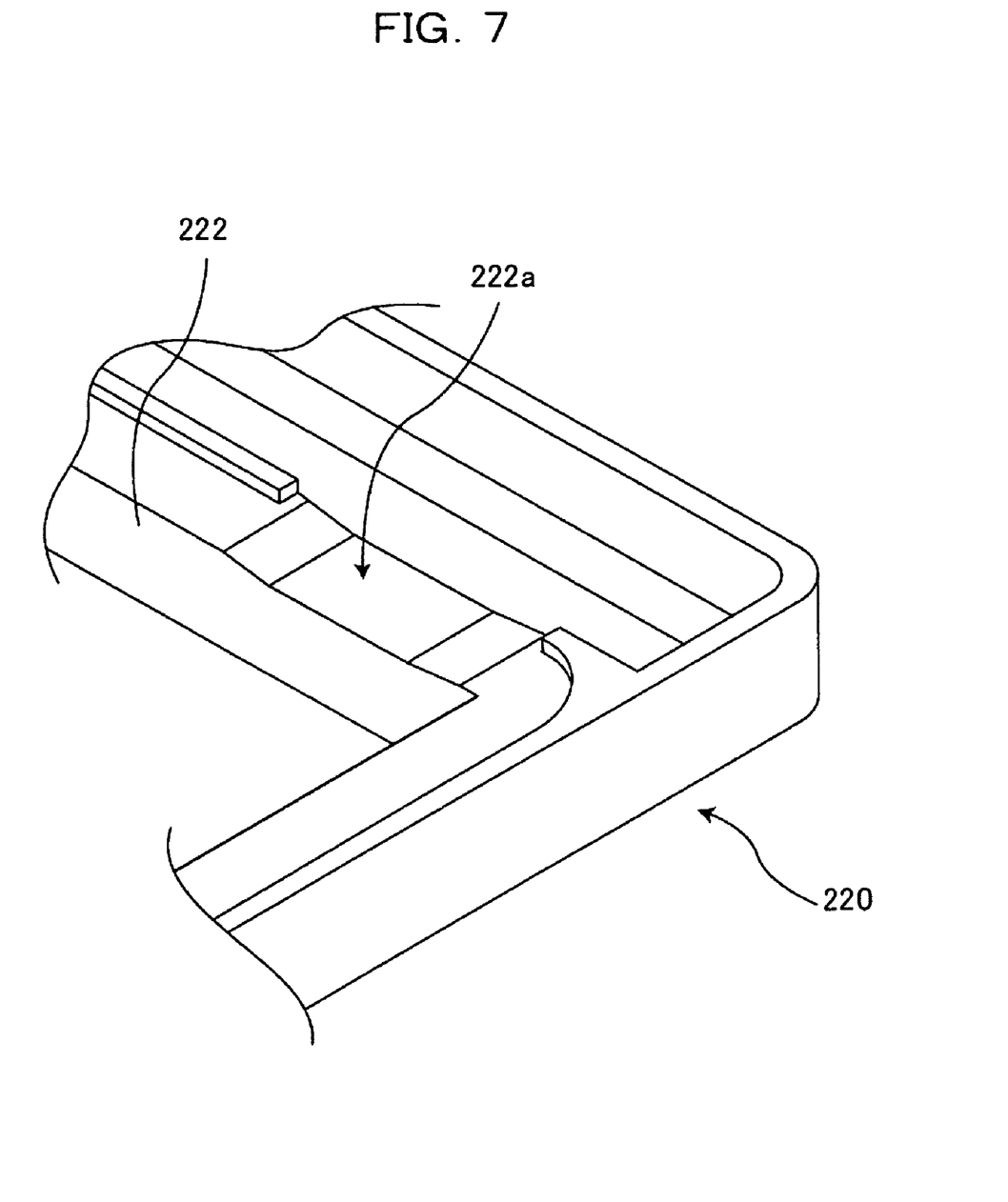
FIG. 7 is a perspective view of a part of a lower casing of the main unit in a first modification.
Figure 8:
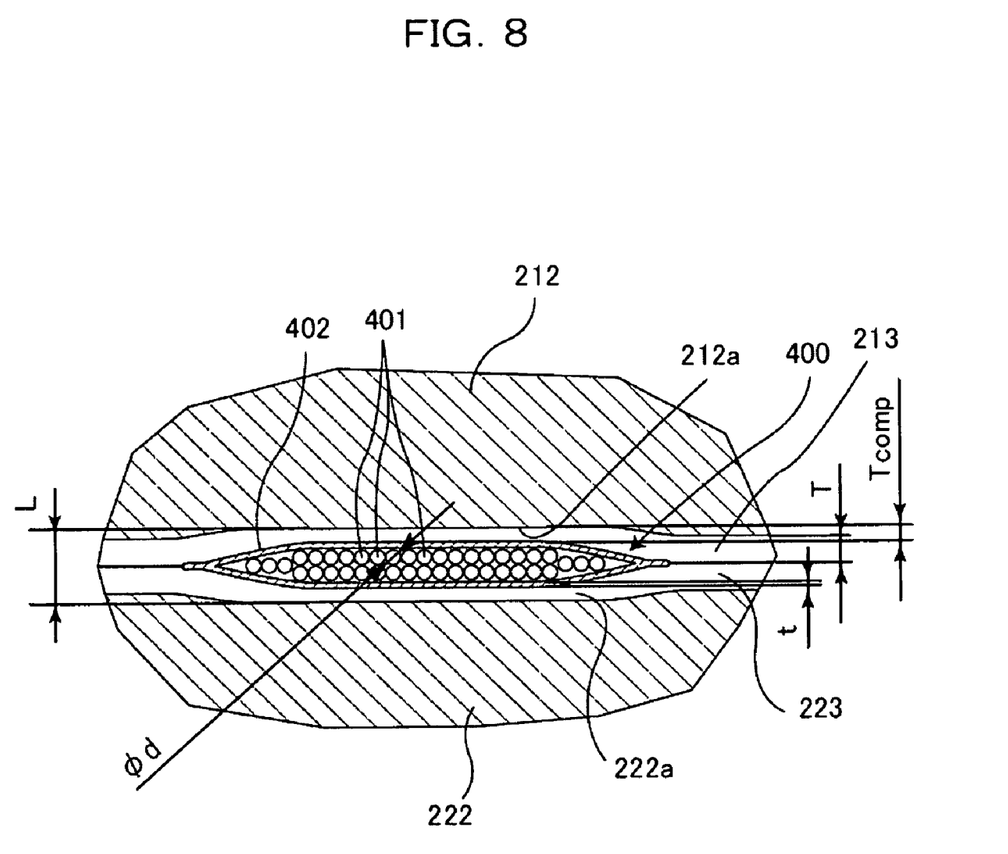
FIG. 8 is a sectional view of a part of a cable in the first modification, the cable being sandwiched between a vertical wall of the upper casing and an upright wall of the lower casing.

FIG. 7 is a perspective view of a part of a lower casing of the main unit in a first modification. FIG. 8 is a sectional view of a part of a cable in the first modification, the cable being sandwiched between a vertical wall of the upper casing and an upright wall of the lower casing.

As shown in FIG. 8, a part of the upright wall 222 of the lower casing 220 has a recess 222a at which the height of the upright wall 222 is smaller than the height of the parts of the upright wall 222 adjacent thereto. The cable 400 is adhered to the recess 222a. Moreover, the vertical wall 212 of the upper casing 210 has a recess 212a at which the height of the vertical wall is relatively small. A part of the cable 400, which extends between the recess 212a of the vertical wall 212 and the recess 222a of the upright wall 222, is sandwiched between the double-sided adhesive tape 213 stuck on the bottom end surface of the vertical wall 212 and the double-sided adhesive tape 223 stuck on the top end surface of the upright wall 222.

In the first modification, the double-sided adhesive tape 213 and 223 is less compressed by the cable 400, which provides a more reliable waterproof structure, since the cable 400 is disposed between the respective recesses 212a and 222a formed on the vertical wall 212 and the upright wall 222. That is, the first modification provides a more stable waterproof structure.

In this case, a relation $L=2\times(h+t+T_{comp})+n\times\phi d$ holds, where h is the depth of each of the recesses 212a and 222a, L is the height of the bonded area when the upper and lower casings are joined, T is the thickness of the uncompressed double-sided adhesive tape, Tcomp is the thickness of the compressed double-sided adhesive tape, $\phi d$ is the diameter of each signal line, t is the thickness of the tube film, and n is the number of signal lines in the depth direction. Note that the depth h is such that h<T.

Although the description is given only for the main unit in the first modification, the display unit has a similar structure.

Figure 9:
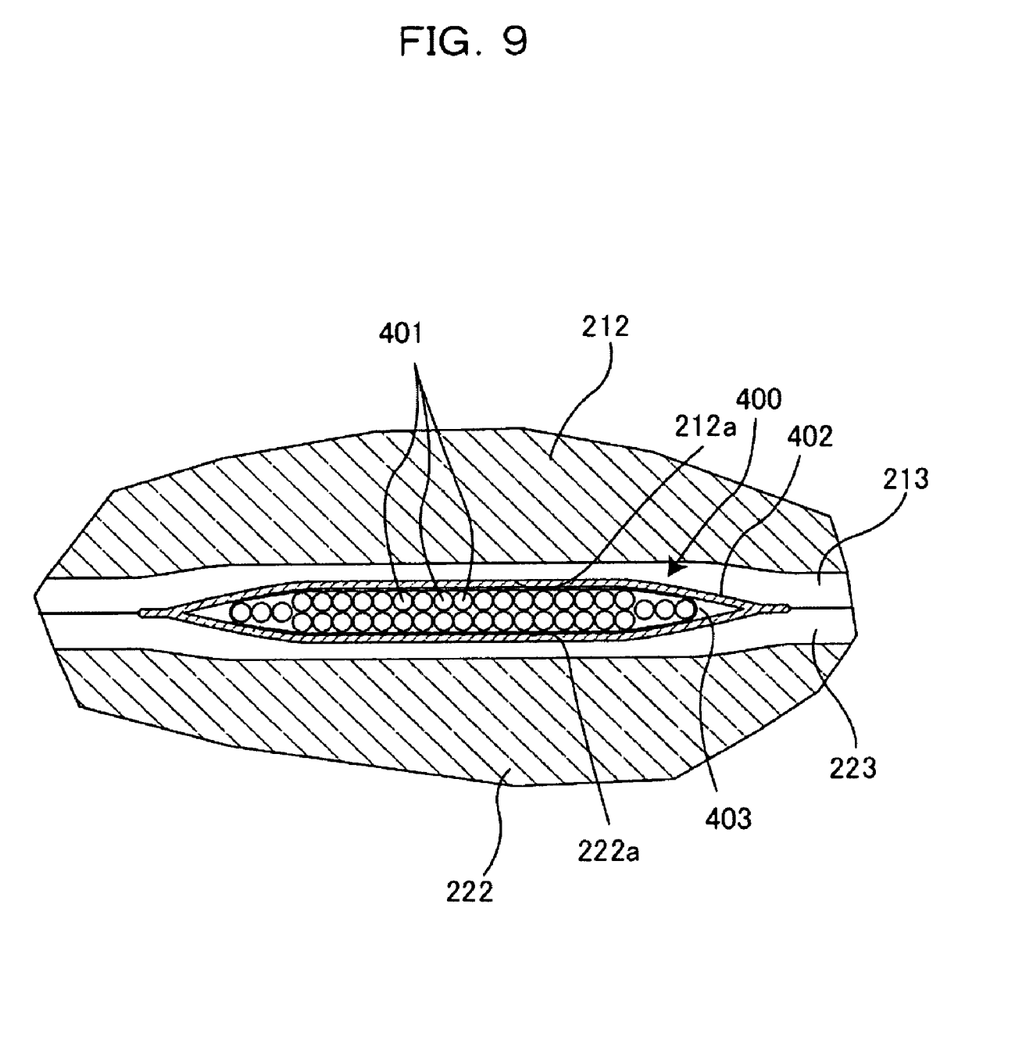
FIG. 9 is a sectional view of a part of a cable in a second modification, the cable being sandwiched between a vertical wall of the upper casing and an upright wall of the lower casing.

FIG. 9 is a sectional view of a part of a cable in a second modification, the cable being sandwiched between a vertical wall of the upper casing and an upright wall of the lower casing.

Referring to FIGS. 7 and 8, differences between the first modification and a second modification are described.

The second modification features the cable 400. As shown in FIG. 9, in addition to the signal lines 401 and the tube 402, the cable 400 includes a restraining member 403.

The restraining member 403 is disposed in a part of the tube 402 at which the cable 400 is sandwiched between the vertical wall 212 and the upright wall 222. The restraining member 403 serves to cover and bundle the signal lines 401 into a flat shape. The restraining member 403, which is made of a metal or resin film, keeps the signal lines 401 as a whole with a predetermined flatness. The tube 402 is prevented from wrinkling by the restraining member 403, which improves adhesion between the tube 402 and the double-sided adhesive tapes 213 and 223.

With the second modification, the shape of the tube 402 is more stable, which provides a more stable waterproofness.

Figure 10:
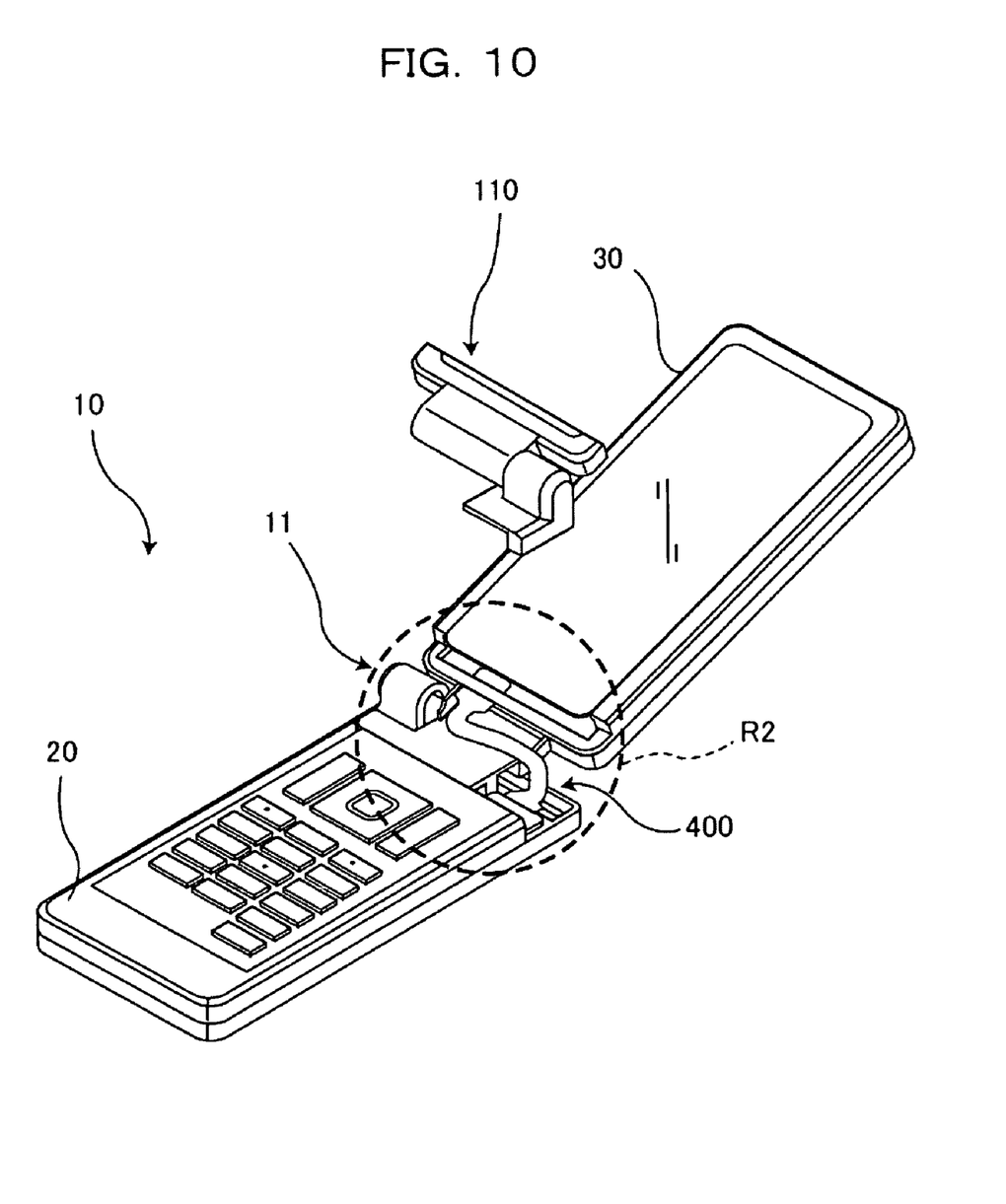
FIG. 10 is a perspective view of a mobile phone according to another modification.
Figure 11:
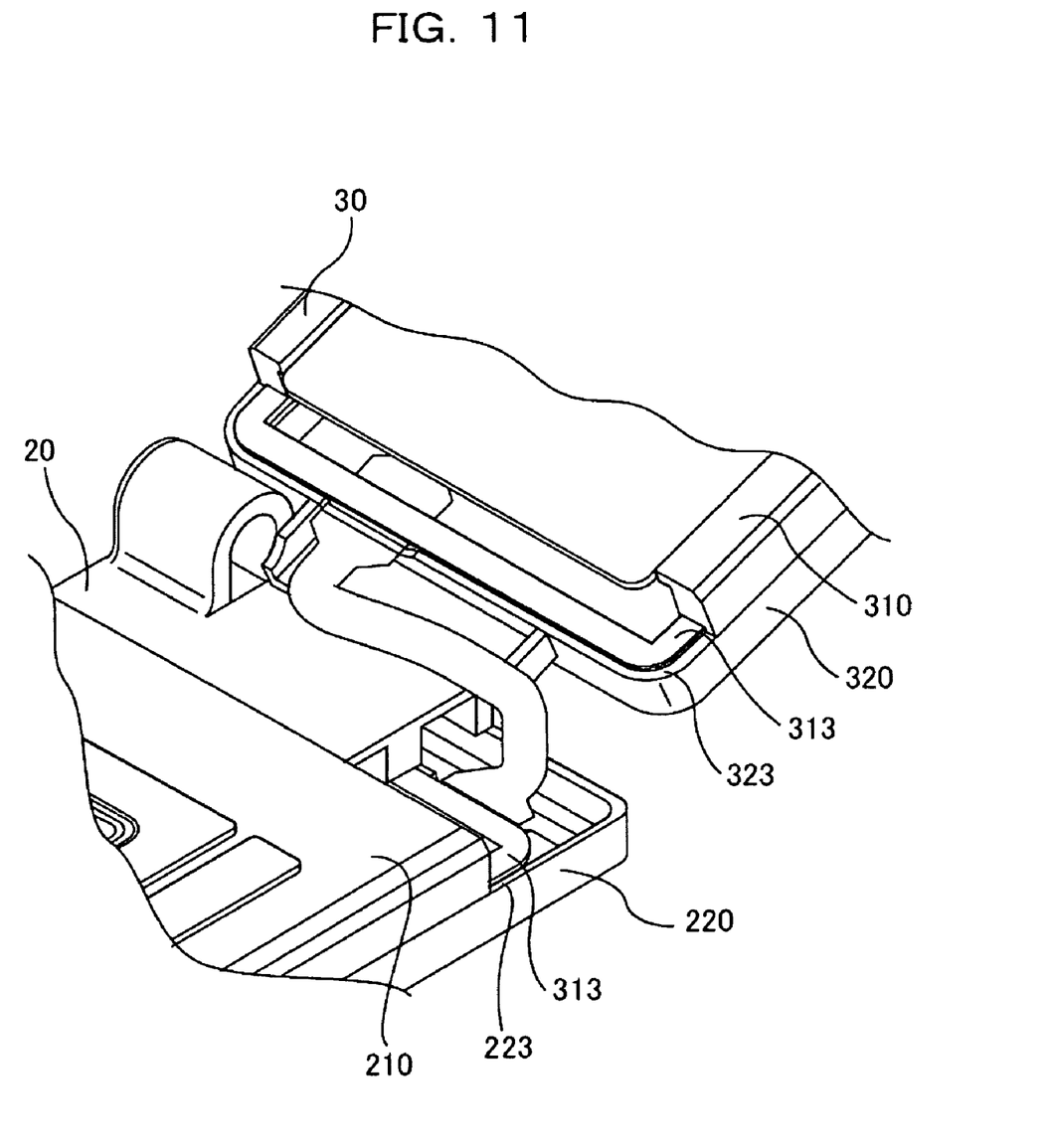
FIG. 11 is an enlarged view of an area in a circle R2 shown in FIG. 10.

FIG. 10 is a perspective view of a mobile phone according to another modification. FIG. 11 is an enlarged view of an area in a circle R2 shown in FIG. 10.

Referring to FIG. 10, the mobile phone 10, as in the mobile phone shown in FIG. 1, includes a main unit 20 and a display unit 30 that can be opened and closed relative to the main unit 20 about a hinge 11. The mobile phone shown in FIG. 1 includes the main unit 20 having the casing 200 with an upper casing 210 and a lower casing 220, the display unit 30 having the casing 300 with an upper casing 310 and a lower casing 320, and the cable 400 being sandwiched between the upper casings 210 and 310 and the corresponding lower casings 220 and 320. The mobile phone shown in FIG. 10 differs from the mobile phone shown in FIG. 1 in that the mobile phone shown in FIG. 10 includes a hinge cover 110, which is an independent member. A part of the upper casing 210 of the main unit 20 adjacent to the hinge 11 and a part of the upper casing 310 of the display unit 30 adjacent to the hinge 11 are integrally formed as the hinge cover 110. The cable 400 is sandwiched between the lower casing 220 of the main unit 20 and the hinge cover 110 and between the lower casing 320 of the display unit 30 and the hinge cover 110. Other elements have structures similar to those of the mobile phone shown in FIG. 1.

As shown in FIGS. 10 and 11, the cable is not necessarily sandwiched between the upper casing and the lower casing. This embodiment is applicable to an electronic appliance including a casing having a bottom panel, a top panel, and a side wall surrounding the bottom and top panels and forming an inner space together with the bottom and top panels, in which at least a part of the side wall is made of a plurality of members divided into an upright wall adjacent to the bottom panel and a vertical wall adjacent to the top panel.

According to the embodiment, sufficient waterproofness can be provided for an electronic appliance having a casing through which signal lines extend.

All examples and conditional language recited herein for pedagogical purposes to aid the reader in understanding the principles of the invention and the concepts contributed by the inventor to furthering the art, and are to be construed as being without limitation to such specifically recited examples and conditions, nor does the organization of such example in the specification relate to a showing of the superiority and inferiority of the invention. Although the embodiments of the present inventions have been described in detail, it should be understood that the various changes, substitutions, and alterations could be made hereto without departing from the sprit and scope and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A waterproof electronic appliance, comprising:
  a casing including a bottom panel, a top panel, and a side wall, at least a part of the side wall being divided into an upright wall adjacent to the bottom panel and a vertical wall adjacent to the top panel, the side wall surrounding the bottom panel and the top panel and forming an inner space together with the bottom panel and the top panel;
  a first double-sided adhesive tape, a surface of which is stuck on a top end surface of the upright wall, the first double-sided adhesive tape extending along the top end surface of the upright wall;
  a second double-sided adhesive tape, a surface of which adheres to a bottom end surface of the vertical wall, the second double-sided adhesive tape extending along the bottom end surface of the vertical wall; and
  a cable extending from inside to outside of the casing through the upright wall and the vertical wall, the cable including signal lines, and
  a tube disposed at least at a part of the cable sandwiched between the upright wall and the vertical wall, the tube covering the signal lines and having a flat shape extending in a direction in which the top end surface of the upright wall and the bottom end surface of the vertical wall extend,
  wherein the first and second double-sided adhesive tapes adhere to an outer surface of the tube at the part of the cable sandwiched between the upright wall and the vertical wall, and the adhesive tapes adhere to each other in an area adjacent to the sandwiched part.

2. The waterproof electronic appliance according to claim 1, wherein the cable further includes a restraining member surrounding a portion of the signal lines disposed in the tube at the part of the cable sandwiched between the upright wall and the vertical wall, the restraining member restraining the portion of the signal lines into a flat shape.

3. The waterproof electronic appliance according to claim 1, wherein each of the upright wall and the vertical wall has a recess in a part of the wall through which the cable extends and the height of the wall at the recess is smaller than the height of parts of the wall adjacent thereto.

4. The waterproof electronic appliance according to claim 1, wherein the tube is made of a soft waterproof material.

5. The waterproof electronic appliance according to claim 1, wherein a backing of the double-sided adhesive tape is made of a material whose thickness is reduced when pressed.

6. A waterproof electronic appliance, comprising:
   a casing including a bottom panel, a top panel, and a side wall, the side wall being divided into an upright wall adjacent to the bottom panel and a vertical wall adjacent to the top panel;
   a first double-sided adhesive tape being adhered on a top end surface of the upright wall;
   a second double-sided adhesive tape being adhered on a bottom end surface of the vertical wall; and
   a cable including signal lines and a tube covering the signal lines, the cable extending from inside to outside of the casing through the upright wall and the vertical wall;
   wherein the first and second double-sided adhesive tapes adhere to an outer surface of the tube sandwiched between the upright wall and the vertical wall, and the adhesive tapes adhere to each other in an area adjacent to the sandwiched tube.

7. A method of waterproofing an electronic appliance, comprising:
   providing a casing including a bottom panel, a top panel, and a side wall;
   dividing at least a part of the side wall into an upright wall adjacent to the bottom panel and a vertical wall adjacent to the top panel;
   surrounding the bottom panel and the top panel with the side wall;
   forming an inner space with the side wall, the bottom panel, and the top panel;
   adhering a surface of a first double-sided adhesive tape to a top end surface of the upright wall;
   extending the first double-sided adhesive tape along the top end surface of the upright wall;
   adhering a surface of a second double-sided adhesive tape to a bottom end surface of the vertical wall;
   extending the second double-sided adhesive tape along the bottom end surface of the vertical wall;
   providing a cable including signal lines;
   extending the cable from an inside to an outside of the casing through the upright wall and the vertical wall;
   sandwiching the cable between the upright wall and the vertical wall;
   providing a tube having a flat shape extending in a direction in which the top end surface of the upright wall and the bottom end surface of the vertical wall extend;
   disposing the tube at a part of the cable sandwiched between the upright wall and the vertical wall;
   covering the signal lines with the tube;
   adhering the first and second double-sided adhesive tape to an outer surface of the tube at the part of the cable sandwiched between the upright wall and the vertical wall; and
   adhering the adhesive tape to each other in an area adjacent to the sandwiched part.

* * * * *